(12) United States Patent
Abbott et al.

(10) Patent No.: US 10,744,369 B2
(45) Date of Patent: Aug. 18, 2020

(54) EXERCISE HANDLES

(71) Applicants: Ethan Abbott, Orem, UT (US); Riley Lynn White, Springville, UT (US); Ryker Lee Haddock, Provo, UT (US)

(72) Inventors: Ethan Abbott, Orem, UT (US); Riley Lynn White, Springville, UT (US); Ryker Lee Haddock, Provo, UT (US)

( * ) Notice: Subject to any disclaimer, the term of this patent is extended or adjusted under 35 U.S.C. 154(b) by 0 days.

(21) Appl. No.: 16/382,893

(22) Filed: Apr. 12, 2019

(65) Prior Publication Data

US 2019/0314671 A1 Oct. 17, 2019

Related U.S. Application Data

(60) Provisional application No. 62/712,187, filed on Jul. 30, 2018, provisional application No. 62/656,573, filed on Apr. 12, 2018.

(51) Int. Cl.

| A63B 21/00 | (2006.01) |
|---|---|
| A63B 21/068 | (2006.01) |
| A63B 1/00 | (2006.01) |
| A63B 23/12 | (2006.01) |
| F16B 2/12 | (2006.01) |
| A63B 21/16 | (2006.01) |

(52) U.S. Cl.
CPC ............ *A63B 21/4035* (2015.10); *A63B 1/00* (2013.01); *A63B 21/068* (2013.01); *A63B 21/1627* (2013.01); *A63B 23/1218* (2013.01); *F16B 2/12* (2013.01); *A63B 2208/029* (2013.01); *A63B 2210/50* (2013.01)

(58) Field of Classification Search
CPC .............. A63B 21/068; A63B 21/1627; A63B 21/1636; A63B 21/4035; A63B 1/00; A63B 23/1218; F16B 2/12; F16B 7/20
See application file for complete search history.

(56) References Cited

U.S. PATENT DOCUMENTS

| 3,716,232 A * | 2/1973 | Johnson ................. A63B 1/005 482/40 |
| 4,529,191 A * | 7/1985 | Miller ...................... A63B 1/00 211/123 |
| 5,042,118 A * | 8/1991 | Rubik .................. A47G 25/485 24/523 |
| 5,429,571 A * | 7/1995 | Smith .................. A63B 21/018 482/114 |

(Continued)

*Primary Examiner* — Jennifer Robertson
(74) *Attorney, Agent, or Firm* — Superior IP, PLLC; Dustin L. Call (57) ABSTRACT

An exercise handle that includes a clamp configured to secure the exercise handle in place. The clamp includes a first portion that includes a first section and a second section. The clamp also includes a spring within the first portion. The spring biases the clamp in a closed position. The clamp further includes a second portion, where the second portion includes a first arm on the first section and a second arm on the second section. The exercise handle also includes a first block attached to the first arm of the second portion and a second block attached to the second arm of the second portion. The exercise further includes a handle. The handle includes a first segment, the first segment placed around at least some of the first portion and a second segment extending perpendicularly from the first segment and rotates relative to the first portion.

20 Claims, 9 Drawing Sheets

(56) References Cited

U.S. PATENT DOCUMENTS

| | | | | |
|---|---|---|---|---|
| 5,462,508 | A * | 10/1995 | Schiavone | A63B 21/055 482/122 |
| 6,129,650 | A * | 10/2000 | Wedge, Jr. | A63B 71/0009 482/139 |
| 8,864,638 | B2 * | 10/2014 | Ross | A63B 21/1636 482/141 |
| 2011/0172068 | A1 * | 7/2011 | Tyson, III | A63B 23/03541 482/127 |
| 2011/0173778 | A1 * | 7/2011 | Wales | B25G 1/06 16/426 |
| 2012/0302410 | A1 * | 11/2012 | Kitchens | A63B 21/00047 482/96 |
| 2013/0072365 | A1 * | 3/2013 | Ross | A63B 23/1236 482/141 |
| 2013/0165298 | A1 * | 6/2013 | Demsey | A63B 7/02 482/40 |
| 2014/0094350 | A1 * | 4/2014 | Sagall | A63B 71/023 482/89 |
| 2014/0357452 | A1 * | 12/2014 | MacColl | A63B 23/1227 482/40 |
| 2015/0105186 | A1 * | 4/2015 | Block | A63B 67/10 473/416 |
| 2016/0256720 | A1 * | 9/2016 | Grant | A63B 21/1627 |
| 2016/0303419 | A1 * | 10/2016 | Karpachevskyy | A63B 21/1636 |

* cited by examiner

EXERCISE HANDLES

CROSS-REFERENCE TO RELATED APPLICATIONS

This application claims the benefit of and priority to U.S. Provisional Patent Application Ser. No. 62/656,573 filed on Apr. 12, 2018, which application is incorporated herein by reference in its entirety.

This application claims the benefit of and priority to U.S. Provisional Patent Application Ser. No. 62/712,187 filed on Jul. 30, 2018, which application is incorporated herein by reference in its entirety.

BACKGROUND OF THE INVENTION

Pullup bars that attach to doorframes, and other exercise handles in general, are not compact. In particular, since pullup bars are a long horizontal bar, they take up space across the width of the door. In addition, they are often left on doorways, which prevents the door from closing. Thus, rather than placing the pullup bar in a location that will be convenient or encourage exercise, they are placed where they will cause the least inconvenience.

In addition, pullup bars don't lock onto the attachment location. That is, they are essentially balanced on the top of a door frame. While they purport to use the user's weight to stabilize the bar position, if the user shifts his/her weight then the stability of the bar can be dramatically affected resulting in a fall and/or injury. Installation of brackets or other attachment means increases stability but removes all ability to move the bar, eliminating one of the key benefits of an at home pullup bar.

Further, pullup bars can cause permanent damage. For example, many pullup bars have a support bar which is pressed against a door frame to prevent the pullup bar from falling. This pressure can cause damage to the door frame. In addition, the weight is all supported by a small portion of a door's upper molding. Over time, this can move or otherwise damage the molding.

Finally, pullup bars do not travel well. Their bulkiness means that they are not able to be placed in luggage. Therefore, any travel requires at least partial disassembly of the pullup bar. This is an inconvenience that means many users will simply refuse to take the pullup bar, missing out on the benefits of this exercise.

Accordingly, there is a need in the art for a pullup system which is compact, stable, doesn't cause damage and travels well.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes an exercise handle. The exercise handle includes a clamp configured to secure the exercise handle in place. The clamp includes a first portion that includes a first section and a second section. At least a portion of the first section can be placed within at least a portion of the second section and the portion of the first section within the second section can move relative to the second section. The clamp also includes a spring within the first portion. The spring biases the clamp in a closed position, is attached at one end at a first attachment point and is attached at a second end at a second attachment point. The clamp further includes a second portion, where the second portion includes a first arm on the first section and a second arm on the second section. The first portion and the second portion form a "U" shape. The exercise handle also includes a first block attached to the first arm of the second portion and a second block attached to the second arm of the second portion. The exercise further includes a handle. The handle includes a first segment, the first segment placed around at least some of the first portion and a second segment extending perpendicularly from the first segment and rotates relative to the first portion.

Another example embodiment includes an exercise handle. The exercise handle includes a clamp configured to secure the exercise handle in place. The clamp includes a first portion that includes a first section and a second section. At least a portion of the first section can be placed within at least a portion of the second section and the portion of the first section within the second section can move relative to the second section. The clamp also includes a spring within the first portion. The spring biases the clamp in a closed position, is attached at one end at a first attachment point and is attached at a second end at a second attachment point. The clamp further includes a second portion, where the second portion includes a first arm on the first section and a second arm on the second section. The first portion and the second portion form a "U" shape. The exercise handle also includes a first block attached to the first arm of the second portion and a second block attached to the second arm of the second portion. Each block includes a flat surface, where the flat surface is opposite the attachment point between the block and the second portion, a face, where the face of each block is parallel the face of the other block and an underneath surface, where the plane of the underneath surface is parallel to the first portion. Each block also includes a pin and groove, where the pin and grove secures each block to the second portion of the clamp and includes a 90-degree bend in the groove. The exercise further includes a handle. The handle includes a first segment, the first segment placed around at least some of the first portion and a second segment extending perpendicularly from the first segment and rotates relative to the first portion.

Another example embodiment includes an exercise handle. The exercise handle includes a clamp configured to secure the exercise handle in place. The clamp includes a first portion that includes a first section and a second section. At least a portion of the first section can be placed within at least a portion of the second section and the portion of the first section within the second section can move relative to the second section. The clamp also includes a spring within the first portion. The spring biases the clamp in a closed position, is attached at one end at a first attachment point and is attached at a second end at a second attachment point. The clamp additionally includes a cable stop. The cable stop prevents the spring from extending beyond a certain distance, is attached at one end at the first attachment point, and is attached at a second end at the second attachment point. The clamp further includes a second portion, where the second portion includes a first arm on the first section and a second arm on the second section. The first portion and the second portion form a "U" shape. The exercise handle also includes a first block attached to the first arm of the second portion and a second block attached to the second arm of the second portion. Each block includes a flat surface, where the flat surface is opposite the attachment point between the block and the second portion, a face, where the face of each block is parallel the face of the other block and an underneath surface, where the plane of the underneath surface is parallel to the first portion. Each block also includes a textured covering, where the textured covering is placed over at least a portion of each of the flat surface, the face and the underneath surface and a pin and groove, where the pin and grove secures each block to the second portion of the clamp and includes a 90-degree bend in the groove. The exercise further includes a handle. The handle includes a first segment, the first segment placed around at least some of the first portion and a second segment extending perpendicularly from the first segment. The handle also includes a grip on the second segment and a groove within the first segment, where the groove is located along approximately one fourth of the first segment. The handle further includes a screw within the groove in the first segment, the screw and groove allowing 90 degrees of rotation of the first segment relative to the first portion.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
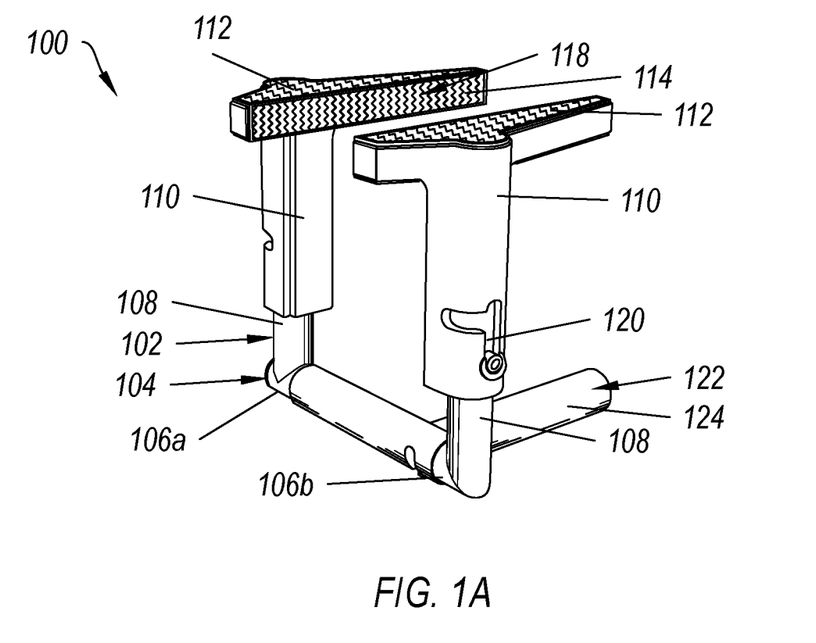
FIG. 1A illustrates a rear right view of the example of an exercise handle.
Figure 1B:
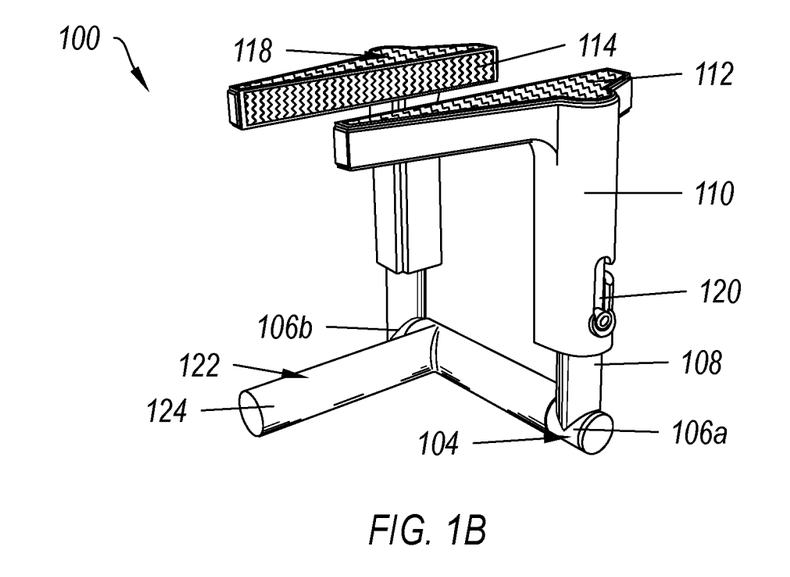
FIG. 1B illustrates a front left view of the example of the exercise handle.
Figure 1C:
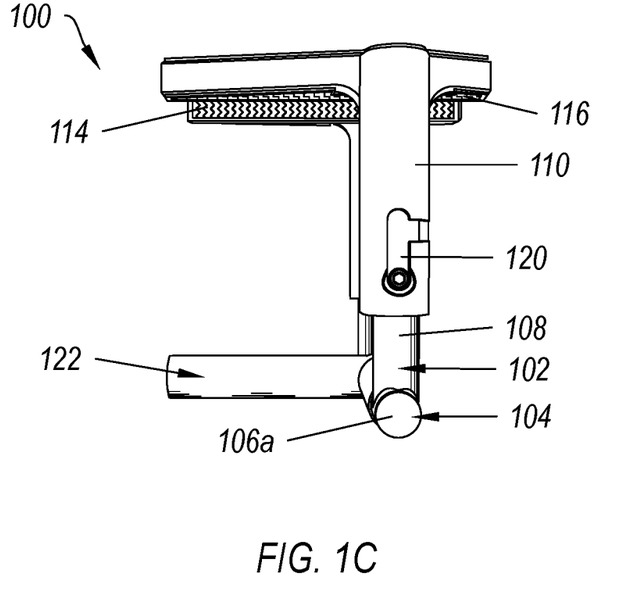
FIG. 1C illustrates a left view of the example of the exercise handle.
Figure 1D:
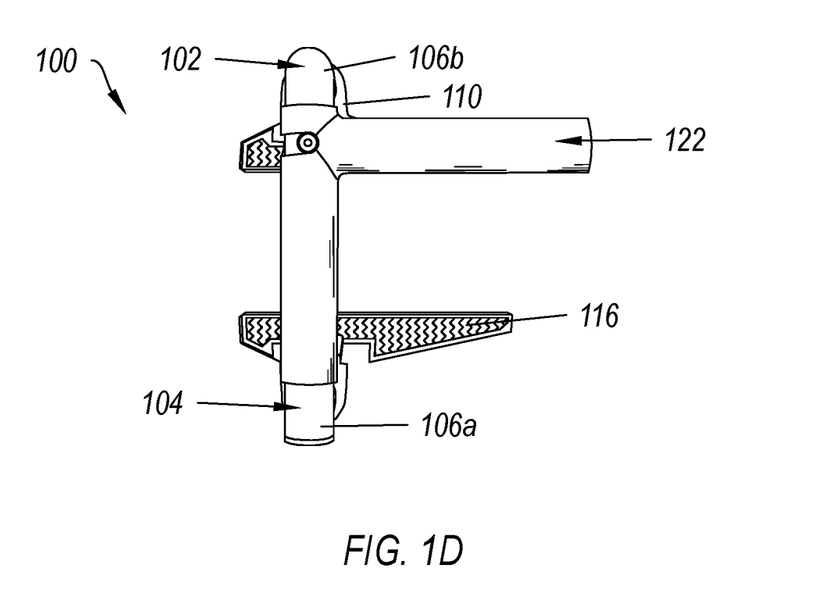
FIG. 1D illustrates a bottom view of the example of the exercise handle.
Figure 1E:
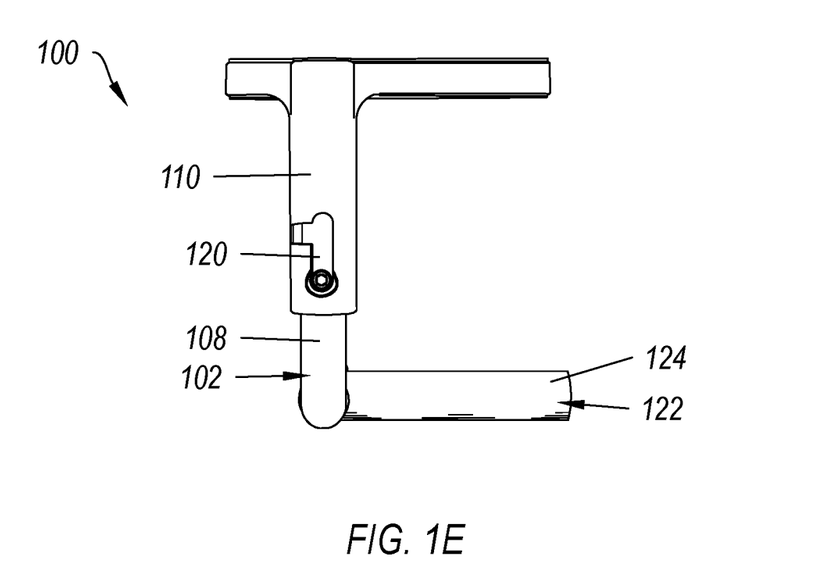
FIG. 1E illustrates a right view of the example of the exercise handle.
Figure 1F:
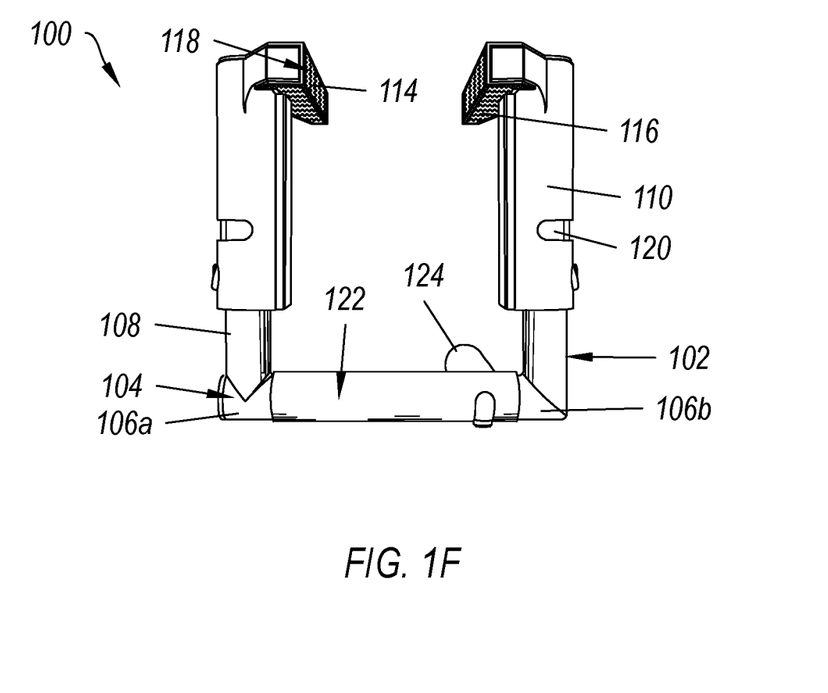
FIG. 1F illustrates a rear view of the example of the exercise handle.
Figure 1G:
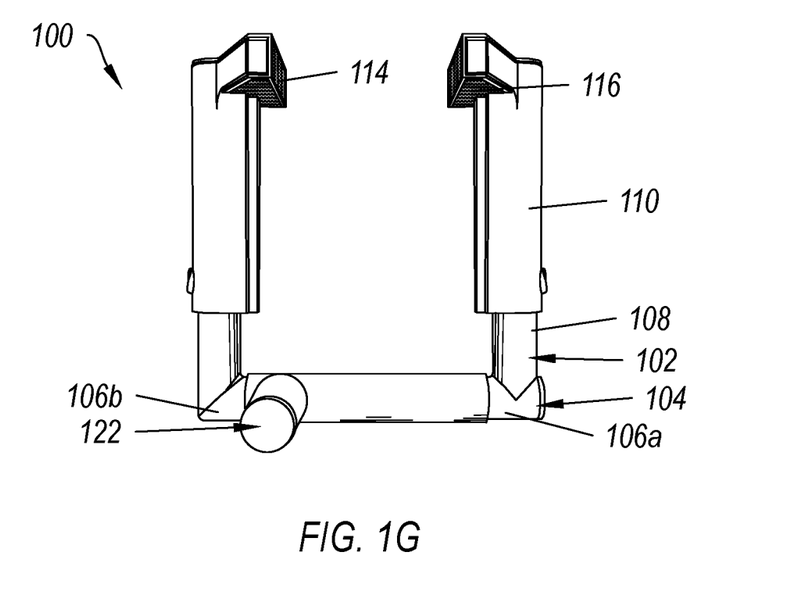
FIG. 1G illustrates a front view of the example of the exercise handle.
Figure 1H:
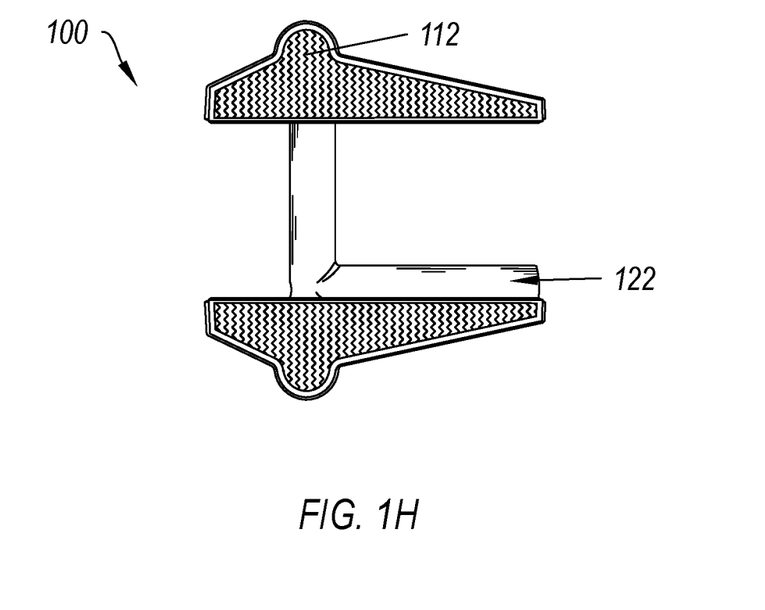
FIG. 1H illustrates a top view of the example of the exercise handle.

FIGS. 1A-1H (collectively "FIG. 1") illustrates an example of an exercise handle 100. FIG. 1A illustrates a rear right view of the example of an exercise handle 100; FIG. 1B illustrates a front left view of the example of the exercise handle 100; FIG. 1C illustrates a left view of the example of the exercise handle 100; FIG. 1D illustrates a bottom view of the example of the exercise handle 100; FIG. 1E illustrates a right view of the example of the exercise handle 100; FIG. 1F illustrates a rear view of the example of the exercise handle 100; FIG. 1G illustrates a front view of the example of the exercise handle 100; and FIG. 1H illustrates a top view of the example of the exercise handle 100. The exercise handle 100 is compact and easy to place. Thus, the exercise handle 100 can be used wherever is most convenient for a user. In addition, the exercise handle 100 is more stable than pullup bars, pushup handles or other exercise equipment.

FIG. 1 shows that the exercise handle 100 can include a clamp 102. The clamp 102 is configured to secure the exercise handle in place. The clamp 102 is adjustable, so that the width of the clamp 102 can be adjusted to the size of the wall on which the exercise handle 100 will be placed. That is, the clamp 102 can be opened to be placed in a desired location. The clamp 102 is biased to be a certain width. For example, the clamp 102 can be between 3 inches and 5 inches wide in the closed position and 3.5 inches and 9 inches in the open position. E.g., the clamp 102 can be approximately 3.5 inches wide in the closed position and 5.5 inches wide in the open position. The width of the clamp 102, both in the closed and open positions, can be critical to ensure that the exercise handle 100 can be attached to a door frame. That is, the width of the clamp 102 can be critical to ensure proper usage of the exercise handle 100. I.e., if the width of the clamp 102 is too large, then the exercise handle 100 will not work on a door frame and if the clamp 102 is too small, then the exercise handle 100 will not fit around a door frame.

As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration. Further, as used in the specification and the claims, the term approximately shall mean that the value is within 10% of the stated value, unless otherwise specified.

FIG. 1 also shows that the clamp 102 can include a first portion 104. The first portion includes two sections that are generally circular. The first section 106a and the second section 106b are in contact with one another when in the closed position (described below in more detail with regard to FIG. 4). In addition, the first section 106a and the second section 106b can move relative to one another, including toward and away from one another to allow the first portion 104 to expand and allow the clamp 102 to be placed in position if/when desired. The diameter of the first portion 104 can be critical to ensure proper operation of the clamp 102 (as described below with regard to FIG. 4).

A biasing mechanism acts to pull the first section 106a within the second section 106b. For example, the clamp 102 can have an internal spring (as described below) which biases to the clamp 102 to its closed or minimum width position. Force can be used to expand the clamp 102, the clamp 102 is placed in position, then the spring closes the clamp 102 and keeps it in position. This also allows for placement of the exercise handles 100 in locations such as above door molding, where it can be expanded beyond the width needed, then moved around the molding and then automatically hold to the wall above the molding.

FIG. 1 further shows that the clamp 102 can include a second portion 108. The second portion 108 may be perpendicular to the first portion 104 such that the first portion 104 and the second portion 108 form a "U" shape. The two pieces of the second portion 108 are not attached to one another directly but are attached through the first portion 104. That is, each of the first section 106a and the second section 106 have a perpendicular attachment and the perpendicular attachments are parallel to one another.

FIG. 1 also shows that the exercise handle 100 can include one or more oblocks 110 attached to the second portion 108 of the clamp 102. Each block 110 is the portion of the exercise handle 100 which allows the user to perform exercises. For example, the block 110 can be pushed against a wall when being used to perform pullups. Likewise, the block 110 can be pushed on the floor during pushups.

FIG. 1 further shows that the block 110 can include a flat surface 112 which is parallel with the first portion 104 of the clamp 102 and perpendicular to the second portion 108. The flat surface 112 creates a stable platform when the exercise handles 100 are used on the floor (for example, during pushups). The flat surface 112 allows the forces placed on the exercise handles 100 to be spread out such that they don't cause damage (for example, when being used on a wood floor).

FIG. 1 additionally shows that the block 110 can include a face 114. The face 114 is the portion of the block 110 which presses against a wall when used to perform pullups. In particular, in at least one configuration the two faces 114 are parallel to one another. Thus, the face 114 of each block 110 can be pushed by the clamp 102 toward the face 114 of the other block 110 creating a pinching motion (which pinches a wall when used for pullups).

FIG. 1 moreover shows that the block 110 can include an underneath surface 116. The underneath surface 116 is the bottom of the block 110 when hanging in a doorway (i.e., it is opposite the flat surface 112). The underneath surface 116 rests against the door molding or other surface which supports the weight of the exercise handle 100 and the user when used for pullups. That is, the underneath surface 116 creates the foundation for the weight transfer to the door frame or molding. Thus, the underneath surface 116 is long enough that the pressure on any point is not enough to damage the door molding or other surface.

FIG. 1 also shows that the block 110 can include a textured covering 118. The textured covering 118 can be placed over the flat surface 112, the face 114, and the underneath surface 116, and any other desired portion of the block 110. The textured covering 118 can prevent movement during use. I.e., the textured surface gets pressed on the wall and friction prevents it from moving laterally. The textured covering 118 can include any desired material, such as plastic or rubber.

FIG. 1 additionally shows that the exercise handle 100 can include a pin and groove 120. The groove in the pin and groove 120 can have a bend, such as a 90-degree bend. This allows the handle to lock in two positions (i.e., in two different positions movement is prevented in at least one direction). The first position has the face 114 parallel to the first portion 104. The first position makes exercise difficult, but it does allow for the exercise handle 100 to be compact, which saves space for travel. The second position has the face 114 perpendicular to the first portion 104. This position is more open but allows for a user to perform exercise. The pin and groove 120 allow a user to switch between positions easily and as needed.

FIG. 1 further shows that the exercise handle 100 can include a handle 122. The handle 122 extends from the first portion 104 and gives the user a place to hold on to for pullups. In particular, the handle 122 includes a first segment which is circular which is placed around the first portion 104 and a second segment which extends perpendicularly from the first portion. The handle is foldable to make the exercise handle 100 more compact, as described below. In addition, the second segment of the handle 122 may be rotatable relative to the first segment, so that a user can place two pullup handles 100 and do pullups using a side-to-side grip or a front-to-back grip. The handle may be made of any suitable material that is sufficient strong to support the user's weight. For example, the handle 122 can be made of metal, such as steel.

The diameter of the first segment of the handle 122 can be critical to ensure that the handle 122 is not floppy relative to the first portion 104. For example, the inner diameter of the handle 122 can be as close to possible to the outer diameter of the first potion 104. E.g., if the outer diameter of the second section 106b is between 0.6 and 2.0 inches the inner diameter of the first segment of the exercise handle 122 can be between 0.7 and 2.5 inches. In particular, if the outer diameter of the second section 106b is approximately 0.875 inches, the inner diameter of the first segment of the exercise handle 122 can be approximately 0.9 inches.

FIG. 1 additionally shows that the exercise handle 100 can include a grip 124 on the handle 122. The grip 124 prevents the user's hands from moving on the handle 122. For example, the grip 124 can be made of rubber or cloth attached to the handle 122, such that the rubber or cloth prevents the user's hands from moving along the handle 122. The grip 124 may be porous to prevent sweat from the user making the grip 124 slick or causing other problems.

Figure 2A:
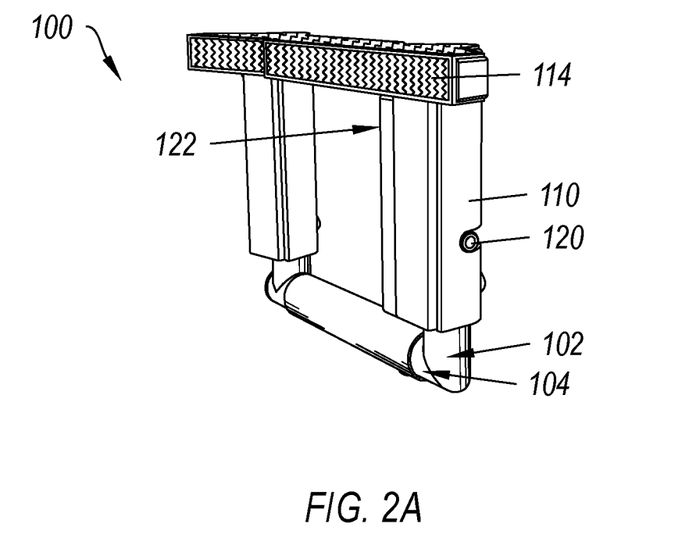
FIG. 2A illustrates a rear right view of the example of the exercise handle in a folded position.
Figure 2B:
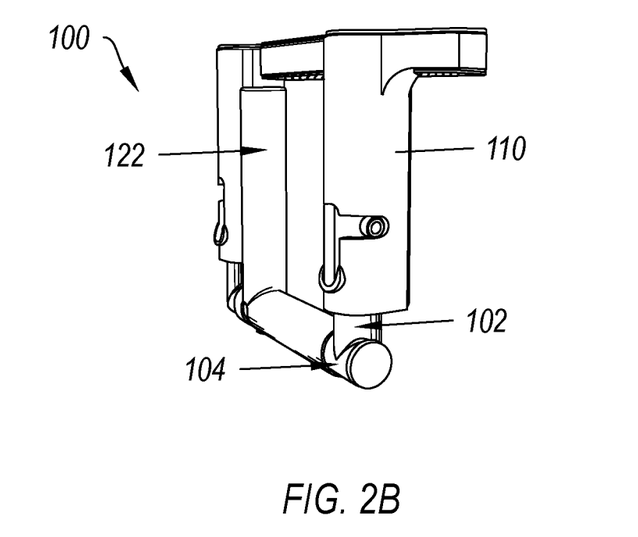
FIG. 2B illustrates a front left view of the example of the exercise handle in a folded position.
Figure 2C:
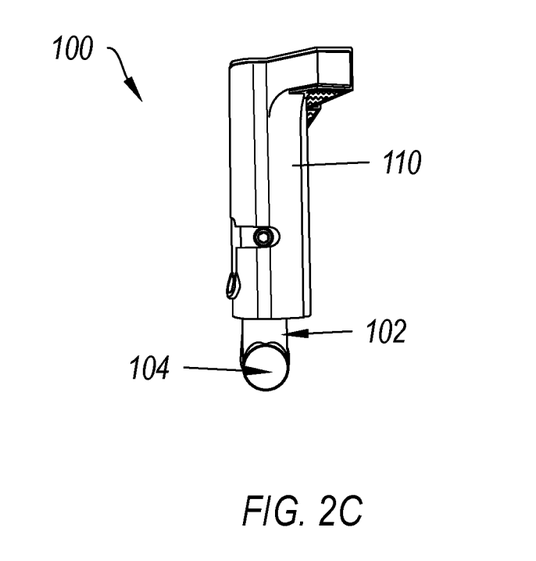
FIG. 2C illustrates a left view of the example of the exercise handle in a folded position, with the right side view being a mirror image thereof.
Figure 2D:
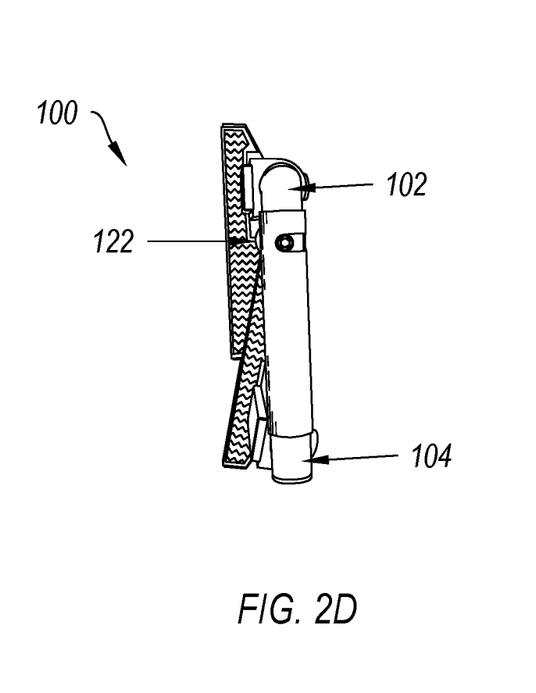
FIG. 2D illustrates a bottom view of the example of the exercise handle in a folded position.
Figure 2E:
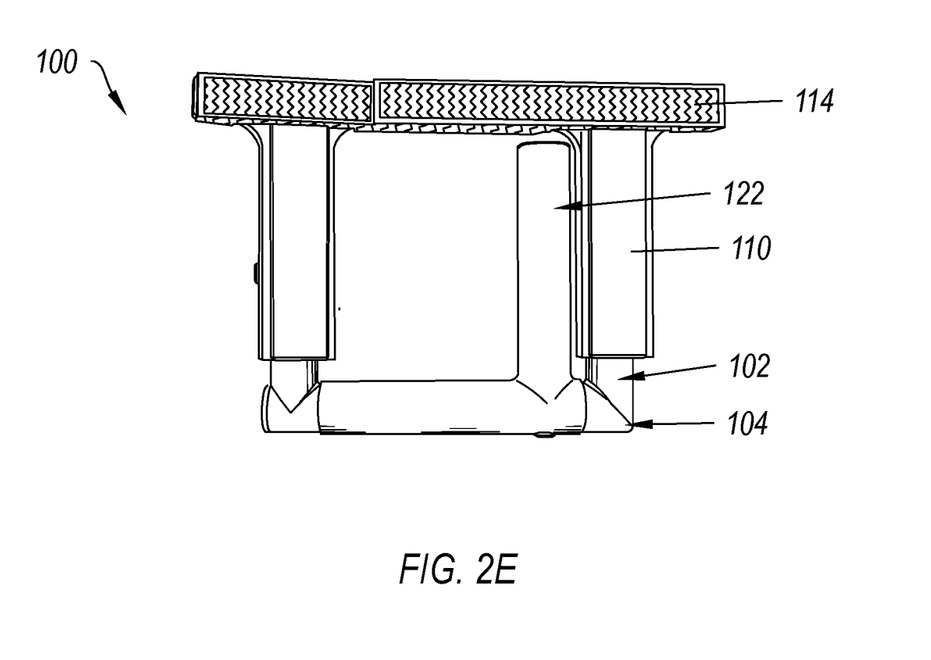
FIG. 2E illustrates a rear view of the example of the exercise handle in a folded position.
Figure 2F:
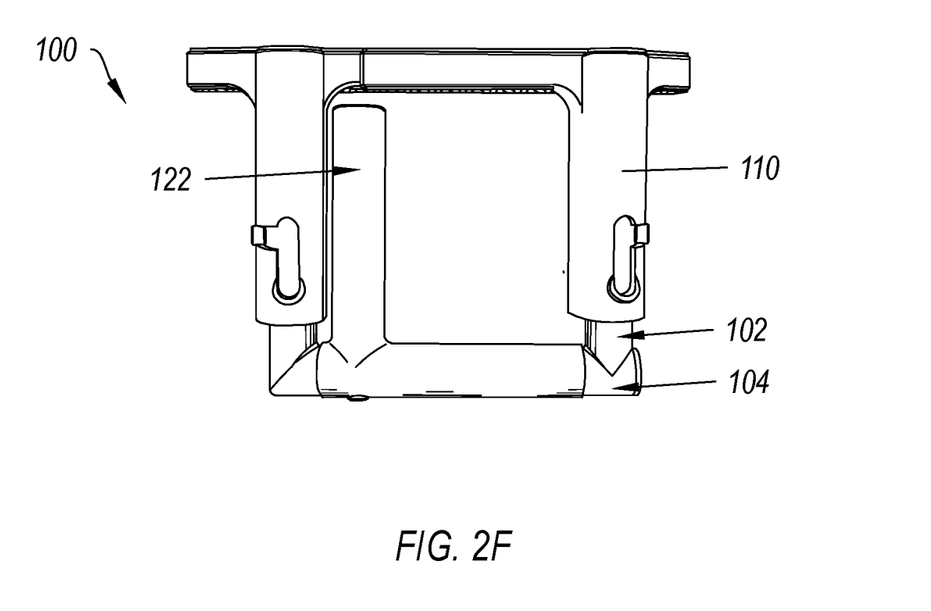
FIG. 2F illustrates a front view of the example of the exercise handle in a folded position.
Figure 2G:
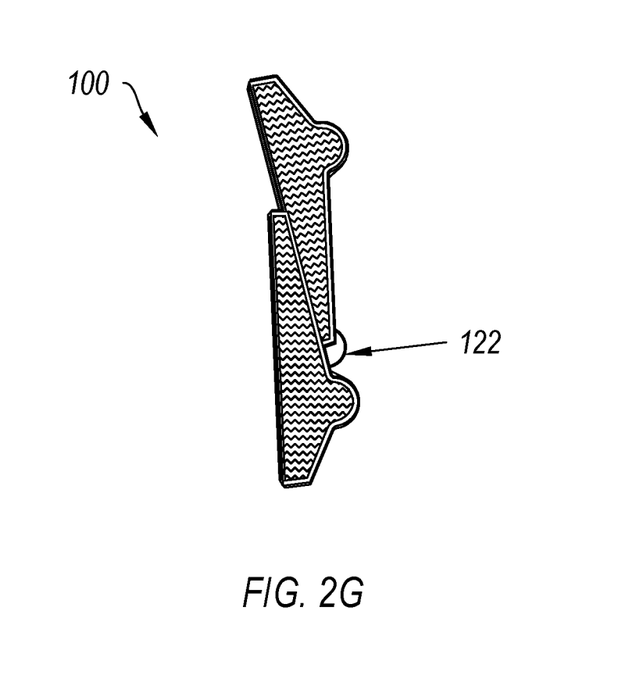
FIG. 2G illustrates a top view of the example of the exercise handle in a folded position

FIGS. 2A-1G (collectively "FIG. 2") illustrates an example of an exercise handle 100 in a folded position. FIG. 2A illustrates a rear right view of the example of the exercise handle 100 in a folded position; FIG. 2B illustrates a front left view of the example of the exercise handle 100 in a folded position; FIG. 2C illustrates a left view of the example of the exercise handle 100 in a folded position; FIG. 2D illustrates a bottom view of the example of the exercise handle 100 in a folded position; FIG. 2E illustrates a rear view of the example of the exercise handle 100 in a folded position; FIG. 2F illustrates a front view of the example of the exercise handle 100 in a folded position; and FIG. 2G illustrates a top view of the example of the exercise handle 100 in a folded position. When in a folded position, the exercise handle 100 is very compact and can be easily transported. I.e., the folded position allows for easy transport of the exercise handle 100.

FIG. 2 shows that the block 110 can be moved relative to the clamp 102. I.e., the block 110 can fold relative to the clamp 102 such that the face 114 is parallel to (i.e., in the same plane as) the first portion 104. When the face 114 and the first portion 104 are in a single plane, they take up less space and are easier to transport. The block 110 can be locked in either the in-use position or in the transport position to prevent folding during use or unfolding during transport using the pin and groove 120, as described above.

FIG. 2 also shows that the handle 122 can be moved relative to the clamp 102. This allows the handle 122 to be folded into the same plane as the clamp 102 and the folded block 110. Similar to the block 110, the handle 122 can be locked in either the unfolded or the folded position to ensure that the handle 122 doesn't change position unexpectedly. With the block 110 and the handle 122 both folded into the same plane as the clamp 102 the exercise handle is very compact and easily transported.

Figure 3:
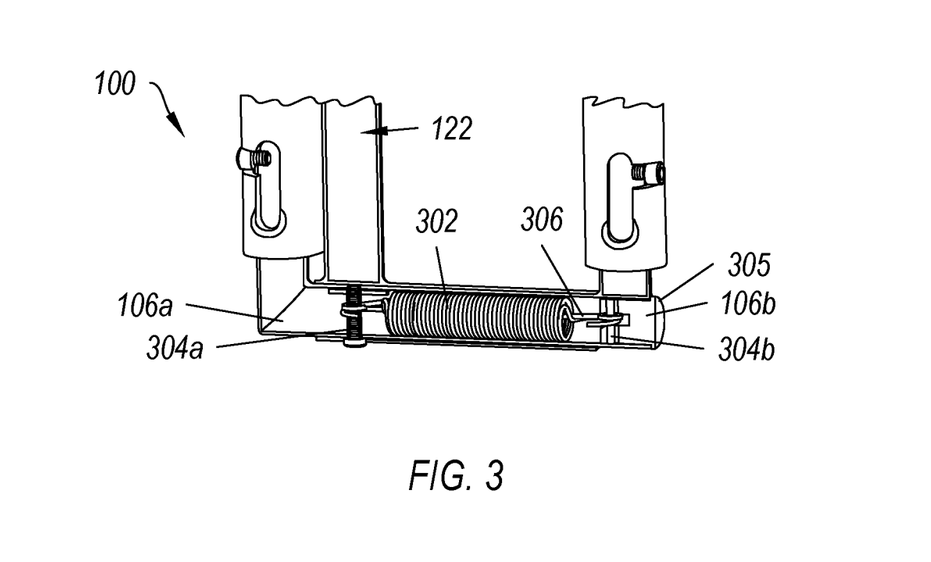
FIG. 3 illustrates a cut-away view of an exercise handle.

FIG. 3 illustrates a cut-away view of an exercise handle 100. The cut-away view shows how the exercise handle can be moved by a user for use or for storage. For example, the exercise handle 100 can be expanded to be placed on a door or can be put into a position that allows a user to do pushups.

FIG. 3 shows that the exercise handle 100 can include a spring 302. The spring 302 is an elastic object that stores mechanical energy. When the spring 302 is extended or stretched stretched from its resting position, it exerts an opposing compressive force that is approximately proportional to its change in length. The spring 302 can be made from any desired elastic material, such as steel. The tension of the spring 302 can be critical to ensure proper operation of the exercise handle 100. In particular, if the tension is too low then normal operation of the exercise handle 100 can result in insufficient force causing the exercise handle 100 to become dislodged and result in injury to a user. However, if the tension is too high then the clamp 102 can be difficult to operate and the block 110 can cause damage to the location of use. Therefore, the tension of the spring 302 can be between 2 and 30 lbs depending on how far it has been stretched. In particular, the tension of the spring 302 can be approximately 12 lbs when clamped on a door frame.

FIG. 3 also shows that the exercise handle 100 can include a first attachment point 304a and a second attachment point 304b (collectively "attachment points 304"). The attachment points 304 allow for the connection of the spring 302 to the first portion 104. I.e., the first attachment point 304a can be within the first section 106a and the second attachment point 304b can be within the second section 106b. Thus, when the second section 106b moves relative to the first section 106a the first attachment point 304a moves relative to the second attachment point 304b, stretching the spring 302. When the spring 302 is stretched, the spring 302 is placing tension on the attachment points, attempting to move the first attachment point 304a closer to the second attachment point 304b, which results in movement of the first section 106a relative to the second section 106b.

The first attachment point 304a can be a screw or other element which acts as a pin in the pin and groove that allows for movement of the handle 122. That is, if the attachment point 304a is a screw, then the screw head can protrude from the first section 106a and rest within a groove in the handle 122. Thus, rotation of the handle 122 is allowed to proceed for approximately 90 degrees but is otherwise prevented. This allows for exercise to occur without rotation of the handle 122. I.e., if the handle 122 rotated further then the handle would not be parallel to the floor during pullups and/or could rotate, making it difficult or impossible for a user's weight to be supported.

Likewise, the second attachment 304b can include a fixed point within the second section 106b. For example, The second attachment point 304b can be placed within an endcap 305. The endcap 305 can allow a user to access the spring 302 when needed, or otherwise access the internal portion of the exercise handle 100 if needed. Additionally or alternatively, the second attachment point 304b can include a post of other point within, and directly attached to the second section 106b. A hook or other portion of the spring 302 can be placed around the second attachment point 304b.

FIG. 3 also shows that the exercise handle 100 can include a cable stop 306. The cable stop 306 attaches to the same attachment points 304 as the spring 302 or other points within the clamp 102. The cable stop 306 prevents the first section 106a from moving too far relative to the second section 106b. I.e., the cable stop 306 prevents the first section 106a and the second section 106b from separating from one another completely and/or stops the spring 302 from deforming. The length of the cable stop 306 (i.e., the maximum length between attachment points 304) can be critical to ensure that the movement of the first section 106a relative to the second section 106b is properly restricted. For example, the cable stop 306 can be between 5 and 10 inches long. E.g., the cable stop 306 can be approximately 7.5 inches long. As used herein the "closed position" of the clamp 102 is when the position where the spring has made the length of the clamp 102 the smallest possible and the "open position" of the clamp 102 is where the clamp is extended to the fullest extent possible given the cable stop 306.

Figure 4:
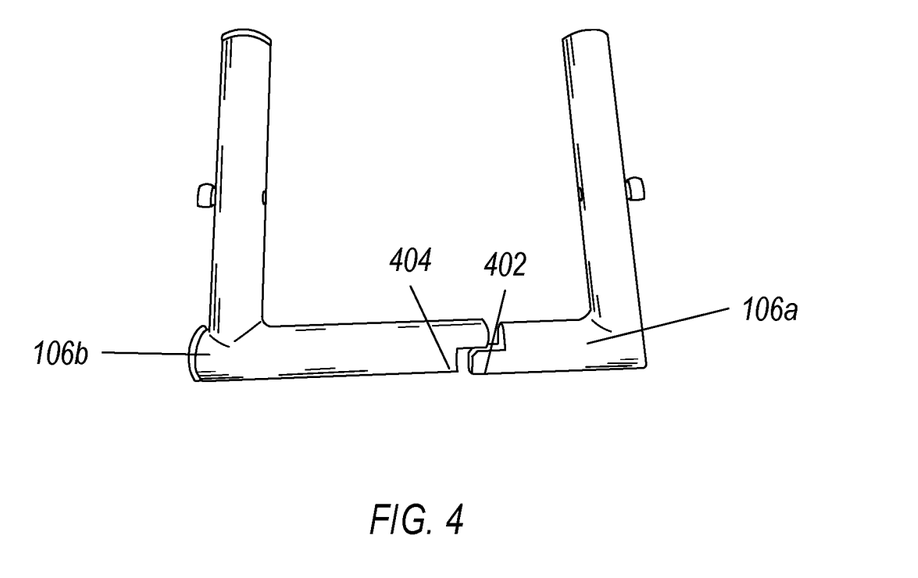
FIG. 4 illustrates the first section and the second section without the handle.

FIG. 4 illustrates the first section 106a and the second section 106b without the handle. In the closed position, the first section 106a and the second section 106b press against one another preventing any further contraction of the spring. Alternatively, in the open position, the first section 106a and the second section 106b move away from one another along their access, constrained to only one possible direction of movement by the handle.

FIG. 4 shows that each of the first section 106a can include a protrusion 402 and a marching indentation 404 in the second section 106b. For example, in FIG. 4 the first section 106a includes a semi-circular protrusion 402 which fits into a semi-circular indentation 404 in the second section 106b. This makes it difficult or impossible for the second section 106b to slide within the first section 106a or vice versa. I.e., the protrusion 402 and the indentation 404 provide an internal "stop" between the first section 106a and the second section 106b.

Alternatively, the first section 106a and the second section 106b could have slightly different diameters such that the first section 106a fits within the second section 106b and is slidable relative to the second section 106b. This allows the first portion 104 to expand and contract as desired. In this arrangement, the diameter of the first section 106a and the second section 106b can be critical to ensure that first section 106a and the second section 106b can move relative to one another and that they are stable relative to one another. For example, the first section 106a can have an outer diameter of between 0.5 inches and 1.5 inches while the second section 106b can have an inner diameter of between 0.6 inches and 2 inches. In particular, the first section 106a can have an outer diameter of approximately 0.875 inches while the second section 106b can have an inner diameter of approximately 0.9 inches. This can ensure that the second section 106b is not "floppy" relative to the first section 106a. I.e., the second section 106b can move laterally along the first section 106a but is not so large that it can move up and down relative to the first section 106a. Ideally, this means that the inner diameter of the second section 106b is as close to the outer diameter of the first section 106a (or vice versa). However, the drawback of this arrangement is that the inner diameter of the handle will be close to the largest of the outer diameter of either the first section 104a and the second section 104b. This means that the section with the smaller diameter have a gap between the outer surface and the inner surface of the handle causing floppiness that a user will be able to feel.

Figure 5:
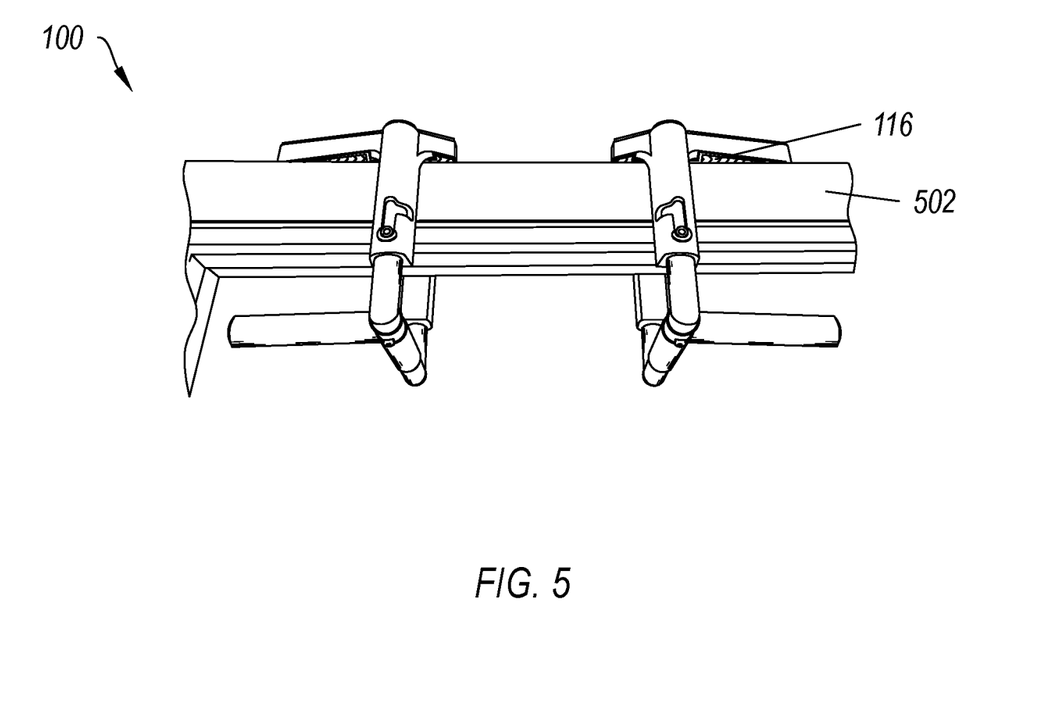
FIG. 5 illustrates an example of the exercise handle in use.

FIG. 5 illustrates an example of the exercise handle 100 in use. The exercise handle 100 is capable of multiple uses, so the example of FIG. 5 is just one example and other examples are contemplated herein. For example, as mentioned above, the exercise handle 100 can be used as pushup handles.

FIG. 5 shows that each face is placed against opposing walls and each underneath surface 116 is placed on the top of a door frame 502. The spring ensures that both faces are pressed against the wall which ensures that all force comes down on the door frame 502. I.e., the force of the spring means that any downward force keeps the underneath surface 116 on the door frame 502.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An exercise handle, the exercise handle comprising:
   a clamp, the clamp:
      configured to secure the exercise handle in place; and including:
         a first portion, wherein the first portion includes:
            a first section, the first section including a protrusion; and
            a second section, the second section including an indentation matching the protrusion of the first section, such that when the protrusion is fully within the indentation that movement of the second section toward the first section is arrested;
         a spring within the first portion, wherein the spring:
            biases the clamp in a closed position;
            is attached at one end at a first attachment point; and
            is attached at a second end at a second attachment point;
         a second portion, wherein the second portion includes:
            a first arm on the first section; and
            a second arm on the second section;
            wherein the first portion and the second portion form a "U" shape;
   a first block attached to the first arm of the second portion; and
   a second block attached to the second arm of the second portion;
   a handle, wherein the handle includes:
      a first segment, the first segment placed around at least some of the first portion;
      a second segment extending perpendicularly from the first segment; and
      rotates relative to the first portion.

2. The exercise handle of claim 1 wherein each block includes a pin and groove.

3. The exercise handle of claim 2, wherein the pin and grove: includes a 90-degree bend in the groove, wherein the 90-degree bend allows each block to be locked in a desired position.

4. The exercise handle of claim 1, wherein the clamp is between 3 inches and 5 inches in the closed position.

5. The exercise handle of claim 4, wherein the clamp is approximately 3.5 inches in the closed position.

6. The exercise handle of claim 1, wherein the clamp is between 3.5 inches and 9 inches in the open position.

7. The exercise handle of claim 6, wherein the clamp is approximately 5.5 inches in the open position.

8. An exercise handle, the exercise handle comprising:
   a clamp, the clamp:
      configured to secure the exercise handle in place; and including:
         a first portion, wherein the first portion includes:
            a first section, the first section including a protrusion; and
            a second section, the second section including an indentation matching the protrusion of the first section, such that when the protrusion is fully within the indentation that movement of the second section toward the first section is arrested;
         a spring within the first portion, wherein the spring:
            biases the clamp in a closed position;
            is attached at one end at a first attachment point; and
            is attached at a second end at a second attachment point;
         a second portion, wherein the second portion includes:
            a first arm on the first section; and
            a second arm on the second section;
            wherein the first portion and the second portion form a "U" shape;
   a first block attached to the first arm of the second portion; and
   a second block attached to the second arm of the second portion;
   wherein each block includes:
      a flat surface, wherein the flat surface is opposite the attachment point between the block and the second portion;
      a face, wherein the face of each block is parallel the face of the other block; and
      an underneath surface, wherein the plane of the underneath surface is parallel to the first portion
      a pin and groove, wherein the pin and grove:
         secures each block to the second portion of the clamp; and
         includes a 90-degree bend in the groove; and
   a handle, wherein the handle includes:
      a first segment, the first segment placed around at least some of the first portion;
      a second segment extending perpendicularly from the first segment; and
      rotates relative to the first portion.

9. The exercise handle of claim 8, wherein the spring has a tension of between 2 and 30 lbs.

10. The exercise handle of claim 9, wherein the spring has a tension of approximately 12 lbs.

11. The exercise handle of claim 8, wherein the first section has a cross-section that is circular and has a diameter of between 0.6 and 2.0 inches.

12. The exercise handle of claim 11, wherein the diameter of the first section is approximately 0.9 inches.

13. The exercise handle of claim 8, wherein: the first section has a cross-section that is circular; the second section has a cross-section that is circular; and the diameter of the second section is approximately equal to the diameter of the first section.

14. The exercise handle of claim 13, wherein the protrusion of the first section is semicircular in shape.

15. The exercise handle of claim 8, wherein the first segment of the handles has a cross-section that is circular and has a diameter of between 0.7 and 2.5 inches.

16. The exercise handle of claim 15, wherein the diameter of the first segment is approximately 0.9 inches.

17. An exercise handle, the exercise handle comprising:
a clamp, the clamp:
configured to secure the exercise handle in place; and including:
a first portion, wherein the first portion includes:
a first section, the first section including a protrusion; and
a second section, the second section including an indentation matching the protrusion of the first section, such that when the protrusion is fully within the indentation that movement of the second section toward the first section is arrested;
a spring within the first portion, wherein the spring:
biases the clamp in a closed position;
is attached at one end at a first attachment point; and
is attached at a second end at a second attachment point;
a cable stop, wherein the cable stop:
prevents the spring from extending beyond a certain distance;
is attached at one end at the first attachment point; and
is attached at a second end at the second attachment point;
a second portion, wherein the second portion includes:
a first arm on the first section; and
a second arm on the second section;
wherein the first portion and the second portion form a "U" shape;
a first block attached to the first arm of the second portion; and
a second block attached to the second arm of the second portion;
wherein each block includes:
a flat surface, wherein the flat surface is opposite the attachment point between the block and the second portion;
a face, wherein the face of each block is parallel the face of the other block; and
an underneath surface, wherein the plane of the underneath surface is parallel to the first portion
a textured covering, wherein the textured covering is placed over at least a portion of each of the flat surface, the face and the underneath surface;
a pin and groove, wherein the pin and grove:
secures each block to the second portion of the clamp; and
includes a 90-degree bend in the groove; and
a handle, wherein the handle includes:
a first segment, the first segment placed around at least some of the first portion;
a second segment extending perpendicularly from the first segment; and
a grip on the second segment;
a groove within the first segment, wherein the groove is located along approximately one fourth of the first segment; and
a screw within the groove in the first segment, the screw and groove allowing 90 degrees of rotation of the first segment relative to the first portion.

18. The exercise handle of claim 17, wherein the cable stop is approximately 7.5 inches long.

19. The exercise handle of claim 17, wherein the grip includes rubber.

20. The exercise handle of claim 17, wherein the grip includes cloth.

* * * * *